United States Patent
Hayashi

(10) Patent No.: US 10,791,473 B2
(45) Date of Patent: *Sep. 29, 2020

(54) WIRELESS COMMUNICATION SYSTEM, BASE STATION DEVICE, MOVE CONTROL NODE, AND METHOD OF WIRELESS COMMUNICATION

(71) Applicant: NEC CORPORATION, Tokyo (JP)

(72) Inventor: Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,360

(22) Filed: Oct. 15, 2019

(65) Prior Publication Data

US 2020/0045566 A1 Feb. 6, 2020

Related U.S. Application Data

(63) Continuation of application No. 16/269,176, filed on Feb. 6, 2019, now Pat. No. 10,492,087, which is a (Continued)

(30) Foreign Application Priority Data

Jan. 31, 2008 (JP) .................... 2008-021304

(51) Int. Cl.
*H04W 24/02* (2009.01)
*H04W 48/16* (2009.01)
(Continued)

(52) U.S. Cl.
CPC ............. *H04W 24/02* (2013.01); *H04W 8/06* (2013.01); *H04W 48/16* (2013.01); *H04W 48/20* (2013.01);
(Continued)

(58) Field of Classification Search
CPC ..... H04W 24/02; H04W 48/16; H04W 48/20; H04W 8/06; H04W 60/00; H04W 60/02; H04W 16/32; H04W 64/003
See application file for complete search history.

(56) References Cited

U.S. PATENT DOCUMENTS 7,962,138 B2 6/2011 Bae et al.
8,224,329 B2 7/2012 Van Lieshout et al.
(Continued)

FOREIGN PATENT DOCUMENTS

CN 1997208 A 7/2007
CN 101009927 A 8/2007
(Continued)

OTHER PUBLICATIONS

European Office Action for EP09 706 665.8-2414 dated Sep. 10, 2012.
(Continued)

*Primary Examiner* — Wayne H Cai
(74) *Attorney, Agent, or Firm* — Sughrue Mion, PLLC

(57) ABSTRACT

A base station is provided. The base station includes a transmitter and a receiver. The transmitter sends, to a node including mobility management function, a first message, the first message including both first information about a tracking area supported in the base station and second information about a size of a cell of the base station. The receiver receives a response message of the first message from the node including mobility management function.

16 Claims, 8 Drawing Sheets

Related U.S. Application Data continuation of application No. 15/912,507, filed on Mar. 5, 2018, now Pat. No. 10,271,230, which is a continuation of application No. 15/419,980, filed on Jan. 30, 2017, now Pat. No. 9,949,150, which is a continuation of application No. 14/969,128, filed on Dec. 15, 2015, now Pat. No. 9,615,323, which is a continuation of application No. 12/865,190, filed as application No. PCT/JP2009/051578 on Jan. 30, 2009, now abandoned.

(51) Int. Cl.
| | | |
|---|---|---|
| H04W 48/20 | (2009.01) | |
| H04W 8/06 | (2009.01) | |
| H04W 60/02 | (2009.01) | |
| H04W 64/00 | (2009.01) | |
| H04W 60/00 | (2009.01) | |
| H04W 16/32 | (2009.01) | |

(52) U.S. Cl.
CPC ......... *H04W 60/02* (2013.01); *H04W 64/003* (2013.01); *H04W 16/32* (2013.01); *H04W 60/00* (2013.01)

(56) References Cited

U.S. PATENT DOCUMENTS

| | | | |
|---|---|---|---|
| 2002/0154609 | A1 | 10/2002 | Saito et al. |
| 2006/0252427 | A1 | 11/2006 | Bridges |
| 2007/0202879 | A1 | 8/2007 | Bae et al. |
| 2008/0013553 | A1 | 1/2008 | Shaheen |
| 2008/0043672 | A1 | 2/2008 | Sebire et al. |
| 2009/0005031 | A1 | 1/2009 | Van Lieshout et al. |
| 2009/0005051 | A1 | 1/2009 | Voyer et al. |
| 2009/0221304 | A1 | 9/2009 | Pudney |
| 2010/0080171 | A1 | 4/2010 | Rune et al. |
| 2010/0091720 | A1 | 4/2010 | Chun |
| 2011/0110326 | A1 | 5/2011 | Rexhepi et al. |

FOREIGN PATENT DOCUMENTS

| | | |
|---|---|---|
| CN | 101026861 A | 8/2007 |
| CN | 101052204 A | 10/2007 |
| EP | 1349408 A2 | 10/2003 |
| JP | 2000-50346 A | 2/2000 |
| JP | 2003174665 A | 6/2003 |
| JP | 2005295108 A | 10/2005 |
| JP | 2006-517376 A | 7/2006 |
| JP | 2006211335 A | 8/2006 |
| JP | 2007-266785 | 10/2007 |
| JP | 2007266785 | 10/2007 |
| JP | 2009-505514 A | 2/2009 |
| WO | 2004114703 A | 12/2004 |
| WO | 2005125249 A | 12/2005 |
| WO | 2007022010 | 2/2007 |
| WO | 2007/083230 A2 | 7/2007 |
| WO | 2007/110138 A1 | 10/2007 |
| WO | 2007129045 A | 11/2007 |

OTHER PUBLICATIONS

Supplementary European Search Report for EP 09 70 6665 completed Jan. 16, 2012.

Communication dated Jan. 31, 2017, issued by the Japanese Patent Office in counterpart application No. 2016-024523.
The US Office Action for U.S. Appl. No. 13/368,555 dated Sep. 25, 2013. (This US OA is a Continuation of the U.S. Appl. No. 12/865,190.).
3GPP TS 23.401 V8.0.0, Technical Specification Group Services and System Aspects; General packet Radio Service (GPRS) enhancements for Evolved Universal Terrestrial Radio Access Network (E-UTRAN) access (Release 8), Dec. 2007.
Japanese Office Action for JP2009-551598 dated Feb. 14, 2012.
RAN Working Group 3 Meeting #59, R3-080126, "The discussion and proposal on the S1 Setup procedure and X2 Setup procedure", NEC Internet: <URL:http//www.3gpp.org/ftp/tsg_ran/WG3_lu/TSGR3_59/docs/RC-080126.zip>, Feb. 5, 2007(3 pages total).
Japanese Office Action for JP2012-120719 dated Jul. 17, 2012.
Ericsson, "S1 Setup procedure", R3-072160 URL, http://www.3gpp.org/ftp/tsg_ran/WG3_lu/TSGR3_58/doccs/R3-072160.zip, Oct. 2007.
Communication dated Jul. 4, 2017, issued by the State Intellectual Property Office of People's Republic of China in counterpart application No. 201510069807.5.
Mitsubishi Electric, "Velocity-optimised tracking areas", 3GPP TSG RAN WG3 Meeting #51bis, R3-060492, Apr. 2006, pp. 1-4.
3GPP TSG-SA WG#59 S2-073219, Mitsubishi Electric, Self-optimization of assigned TA list from reported list of last visited TAs', Internet, <URL:http://www/3gpp.org/ftp/tsg_sa/WG2_Arch/TSGS2_59_Helsinki/Docs/S2-073219.zip>, Aug. 17, 2007(5 pages total).
NEC, "UE-reporting based network-assigned Tracking Areas", R3-061531, 3GPP TSG RAN WG3 Meeting #53 bis, Oct. 10, 2006, URL, http://www.3gpp.org/ftp/tsg_ran/WG3_lu/TSGR3_53bis/docs/R3-061531.zip.
3GPP TS 36.300 V8.2.0, Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Sep. 2007.
Mitsubishi Electric, "Velocity-optimised tracking areas", 3GPP TSG RAN WG3 Meeting #451bis, R3-060492, Apr. 2006, pp. 1-4.
3GPP TSG-RAN WG 3#59 R3-080127, "Correction to the S1 Setup procedure" NEC, Internet, <URL:http://www.3gpp.org/ftp/tsg_ran/WG3_lu/TSGR3_59/docs/R-080127.zip>, Feb. 5, 2008(19 pages total).
3rd Generation Partnership Project; Technical Specification Group Services and System Aspects; 3GPP System Architecture Evolution: Report on Technical Options and Conclusions (Release 7).
Japanese Office Action for JP2011-099561 dated Feb. 14, 2012.
Communication dated Apr. 7, 2016, issued by the United States Patent and Trademark Office in counterpart U.S. Appl. No. 14/969,128.
Japanese Office Action for JP Application No. 2011-281218 dated Jul. 2, 2013 with Partial English Translation.
Japanese Office Action for JP2009-551598 dated Jun. 15, 2011.
Communication dated Jun. 28, 2017, issued by the State Intellectual Property Office of People's Republic of China in counterpart application No. 201510070132.6.
Huawei. Clarification of S-TMSI, C1-072856, 3GPP, Nov. 5, 2007.
Chinese Office Action for CN Application No. 201310110857.4 dated May 6, 2015 with English Translation.
International Search Report for PCT/JP2009/051578 dated Mar. 24, 2009.
Communication dated Dec. 4, 2017 from the State Intellectual Property Office of the P.R.C. in counterpart application No. 201510070132.6.
Mitsubishi Electric "Self-optimization of assigned TA list from reported list of last visited TAs'", 3GPP TSG SA WG2 Meeting #59, S2-073219, Aug. 2007, pp. 1-5.

WIRELESS COMMUNICATION SYSTEM, BASE STATION DEVICE, MOVE CONTROL NODE, AND METHOD OF WIRELESS COMMUNICATION

CROSS REFERENCE TO RELATED APPLICATIONS

The present application is a continuation application of U.S. application Ser. No. 16/269,176 filed Feb. 6, 2019, which is a continuation application of U.S. application Ser. No. 15/912,507 filed Mar. 5, 2018 (now U.S. Pat. No. 10,271,230 issued Apr. 23, 2019), which is a continuation application of U.S. application Ser. No. 15/419,980 filed Jan. 30, 2017 (now U.S. Pat. No. 9,949,150 issued Apr. 17, 2018), which is a continuation application of U.S. application Ser. No. 14/969,128 filed Dec. 15, 2015 (now U.S. Pat. No. 9,615,323 issued Apr. 4, 2017), which is a continuation application of U.S. patent application Ser. No. 12/865,190 filed on Jul. 29, 2010, which is a National Stage Entry of international application PCT/JP2009/051578, filed on Jan. 30, 2009, which claims priority from Japanese Patent Application No. 2008-021304 filed on Jan. 31, 2008, the disclosures each of which are incorporated by reference herein in their entireties.

TECHNICAL FIELD

The present invention relates to a wireless communication system, a base station, a mobility management node, and a wireless communication method.

BACKGROUND ART

According to LTE (Long Term Evolution) that is being standardized in 3GPP (3rd Creation Partnership Projects) at present, there has been proposed a wireless communication system which includes EUTRAN (Evolved UMTS Terrestrial Radio Access Network, UMTS=Universal Mobile Telecommunication System) and EPC (Evolved Packet Core) that are configured as shown in FIG. 1 (4.2.1 of Non-patent document 1, FIGS. 4.2.1-1 and 4.2.1-2 of Non-patent document 2). The above titles are not restrictive, but EUTRAN may be called "LTE", EPC may be called SAE (System Architecture Evolution), and EUTRAN and EPC may collectively be called EPS (Evolved Packet System).

As shown in FIG. 1, the EUTRAN includes eNode B (evolved Node B) 10 as a base station. The EPC includes CN (Core Network) Nodes comprising MME (Mobility Management Entity) 20 as a mobility management node, S-GW (Serving Gateway) 30 as a gateway, P-GW (Packet Data Network Gateway) 40 as a higher-level gateway, and HSS (Home Subscriber Server) 50. eNode 10 is connected to UE (User Equipment) as a wireless communication apparatus through a wireless interface.

MME 20 is a node having a mobility management (location registration) function for UE 60, a handover control function, a selection function for S-GW 30 and P-GW 40, a bearer management function, etc (4.4.2 of Non-patent document 1). S-GW 30 is a node for transferring user-plane packet data between eNode B 10 and P-GW 40. P-GW 40 is a node for transferring transmission packet data from its own network (Home PLMN, PLMN=Public Land Mobile Network) to an external network (Visit PLMN) and transferring reception packet data from an external network to its own network. HSS 50 is a server for saving user information that is used to authenticate UE 60.

According to LTE, TAs (Tracking areas) are assigned to UE 60 as areas in which UE 60 is to be paged when an incoming call is received (5.2.3 of Non-patent document 1). Specifically, when UE 60 registers its location in eNode B 10, TAs are assigned to UE 60 by MME 20, and the list of assigned TAs is registered in UE 60. If UE 60 detects when it has moved to a TA that is not included in the registered list, UE 60 registers its location again in eNode B 10 in order to update the TAs (5.3.3.1 of Non-patent document 1).

In a region where the paging traffic is high, the number of TAs that are assigned to UE 60 when UE 60 registers its location is reduced in order to reduce the number of areas in which UE 60 is to be paged. In order to reduce the number of times that UE 60 registers its location, on the other hand, the number of TAs assigned to UE 60 which is moving at a high speed is increased.

Consequently, there is a trade-off between the number of TAs for reducing the paging traffic and the number of TAs for reducing the number of times that UE 60 registers its location. It is thus necessary to optimize the number of TAs assigned to UE 60 in view of the trade-off.

A general process of assigning TAs to UE 60 will be described below.

It is assumed that from among the respective cells of a plurality of eNodes B 10, cells C #1 through C #23 are arranged as shown in FIG. 2, and cells C #1 through C #23 belong to TA #1 through TA #7 as follows:

TA #1=C #1, C #2, C #3, C #4, C #5
TA #2=C #17, C #18. C #19, C #20, C #21. C #22
TA #3=C #6, C #7, C #8
TA #4=C #9, C #10, C #12, C #13, C #14
TA #5=C #16
TA #6=C #11, C #15
TA #7=C #23

Generally, MME 20 assigns TAs to UE 60 according to a rule that is manually established by the operator. According to the rule, a plurality of TAs are fixedly assigned to UE 60.

Specifically, in the example shown in FIG. 2, the rule is such that when UE 60 registers its location in either one of eNodes B 10 of the cells belonging to TA #1, two TAs represented as TA #1 and TA #4 are fixedly assigned to UE 60.

Even when UE 60, which is moving at a high speed, registers its location in either one of eNodes B 10 of the cells belonging to TA #, TA #1 and TA #4 are assigned to UE 60.

If the cells belonging to TA #1 and TA #4 are of the type which covers a very small range (having a radius of several hundreds meters), for example, then even though MME 20 assigns TA #1 and TA #4 to UE 60, since UE 60 travels through TA #1 and TA #4 and enters TA #5 in several seconds, UE 60 needs to newly register its location.

The time which UE 60 takes to travel through TA #1 and TA #4 will be actually calculated as described below.

It is assumed that UE 60 registers its location in eNode B 10 of C #2 belonging to TA #1, the cells belonging to TA #1 and TA #4 have a diameter of 500 m (meter), and UE 60 travels at a speed of 80 km (kilo meter)/h (hour).

The distance over which UE 60 travels through TA #1 and TA #4 is 2500 in (meter) across five cells (C #2, C #3, C #5, C #12, C #13) (=500 m*5).

Therefore, the time which UE 60 takes to travel through TA #1 and TA #4 is 113 seconds (≈2500 m/80 km/h). This numerical value indicates that UE 60 will do its location registration in about two minutes. Therefore, the number of times that UE 60 registers its location cannot be reduced.

Since the number of times that UE 60 registers its location cannot be reduced, an optimum number of TAs cannot be assigned to UE 60.

According to the practice of fixedly assigning a plurality of TAs to UE 60, a plurality of TAs are also assigned to UE 60 which mostly does not move in daytime. Consequently, since the paging traffic for paging UE 60, when an incoming call is received, has to cover the plural TAs, the paging traffic cannot be reduced, resulting in a large burden imposed on the wireless communication system.

As described above, the practice of fixedly assigning a plurality of TAs to UE 60 is problematic in that an optimum number of TAs cannot be assigned to UE 60.

Furthermore, in as much as the operator manually sets the rule for assigning TAs to UE 60 in MME 20, the rule has to be re-established each time eNode B 10 is added or removed. This requires the operator to spend a lot of time and make a lot of effort, and hence results in an increase in OPEX (Operation and Expenditure).

Non-patent document 1: 3GPP TS 23.401, V8.0.0
Non-patent document 2: 3GPP TS 36.300, V8.2.0

DISCLOSURE OF THE INVENTION

It is an object of the present invention to provide a wireless communication system, a base station, a mobility management node, and a wireless communication method which are capable of solving at least one of the above problems.

A wireless communication system according the present invention comprises a base station and a mobility management node, wherein said base station sends at least one information from among location information of the base station and information about the size of a cell of the base station, to said mobility management node; and said mobility management node receives at least one information from among the location information of the base station and the information about the size of the cell of the base station, from said base station.

A base station according to the present invention comprises a transmitter for sending at least one information from among location information of a base station and information about the size of a cell of the base station, to a mobility management node.

A first mobility management node according to the present invention comprises a receiver for receiving at least one information from among location information of a base station and information about the size of a cell of the base station, from said base station.

A second mobility management node according to the present invention comprises:

a receiver for receiving, from a base station, information about movement of a wireless communication apparatus which registers its location in said base station; and a controller for assigning a tracking area based on information about a layout of said base station and the information about movement.

According to the present invention, a first wireless communication method to be carried out by a base station, comprises:

the transmission step of sending at least one information from among location information of the base station and information about the size of a cell of the base station, to a mobility management node.

According to the present invention, a second wireless communication method to be carried out by a mobility management node comprises the reception step of receiving, from a base station, at least one information from among location information of the base station and information about the size of a cell of the base station.

According to the present invention, the base station is arranged to send at least one information from among the location information of the base station and the information about the size of the cell of the base station, to the mobility management node.

Therefore, since the mobility management node can recognize a layout of cells by receiving at least one information from among the location information of the base station and the information about the size of the cell thereof, the OPEX required by manual operation of the operator for assigning tracking areas can be reduced, and it is possible to assign an optimum number of tracking areas to the wireless communication apparatus.

Figure 7:
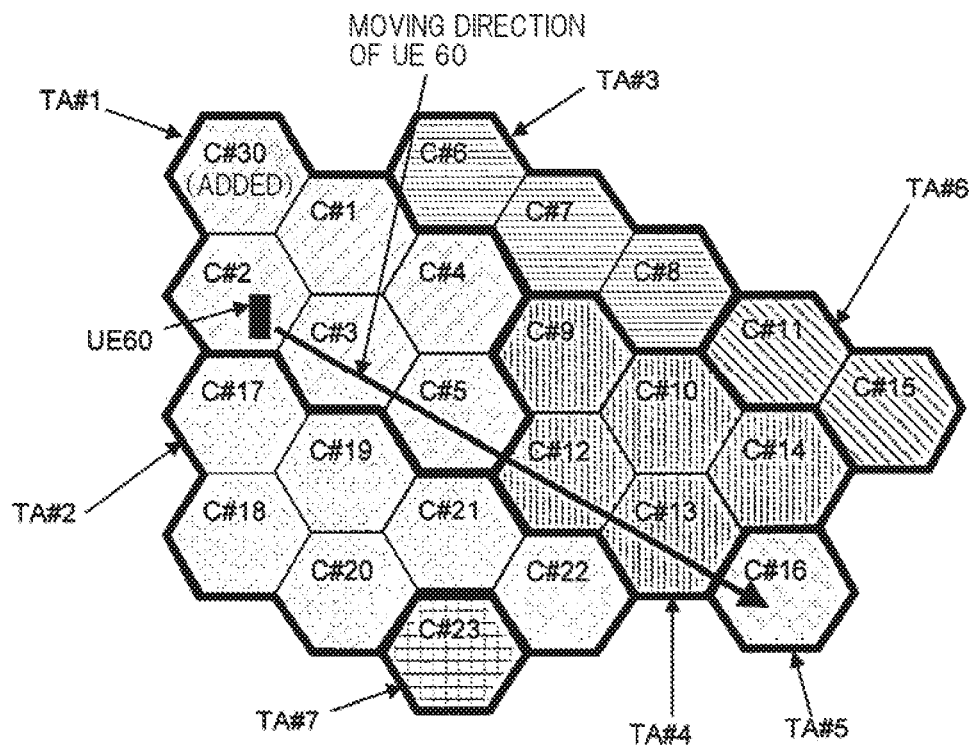
Figure 8:
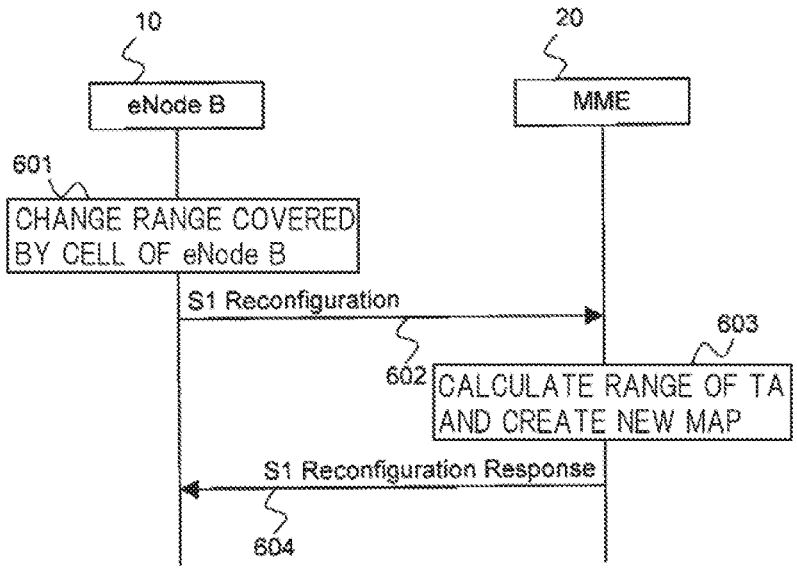
Figure 9:
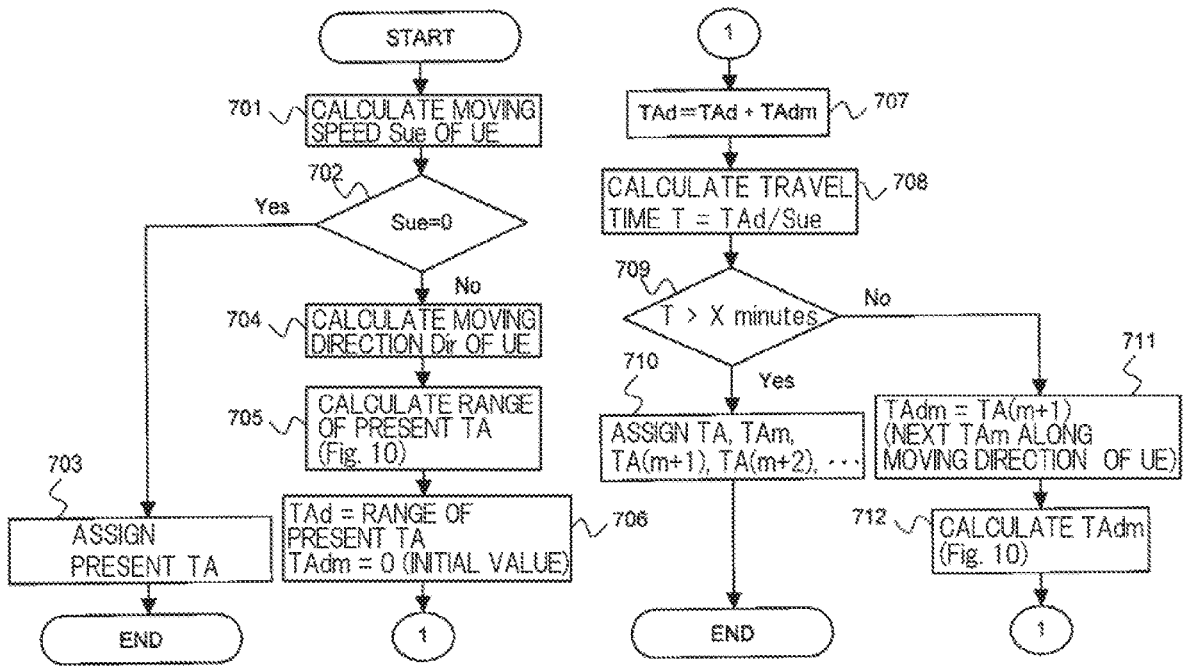
Figure 10:
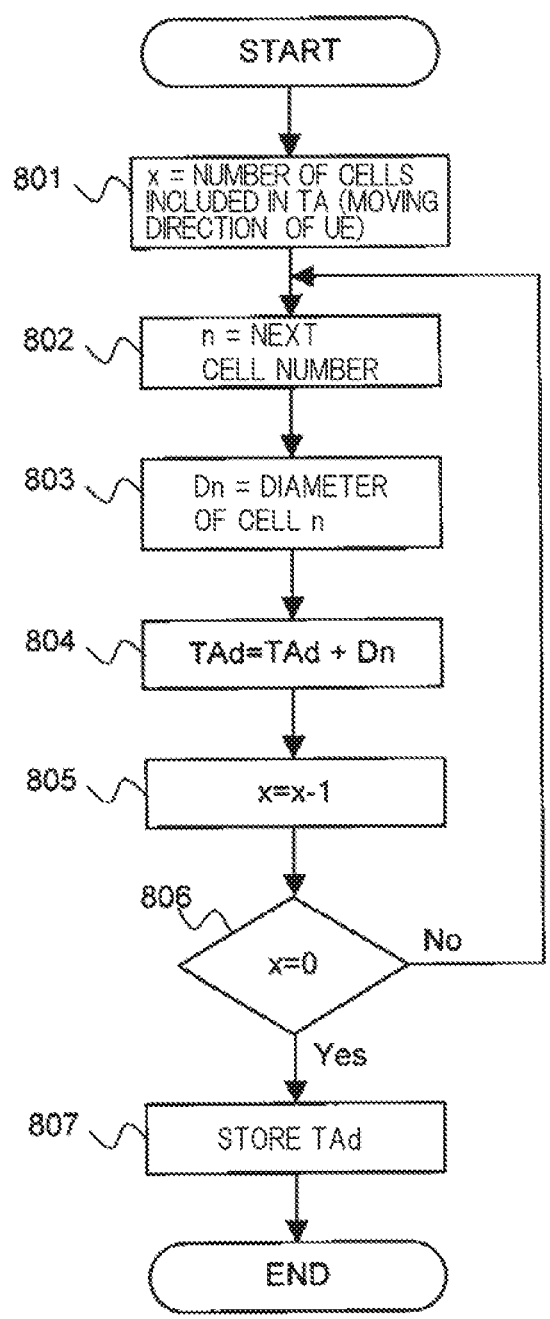
Figure 11:
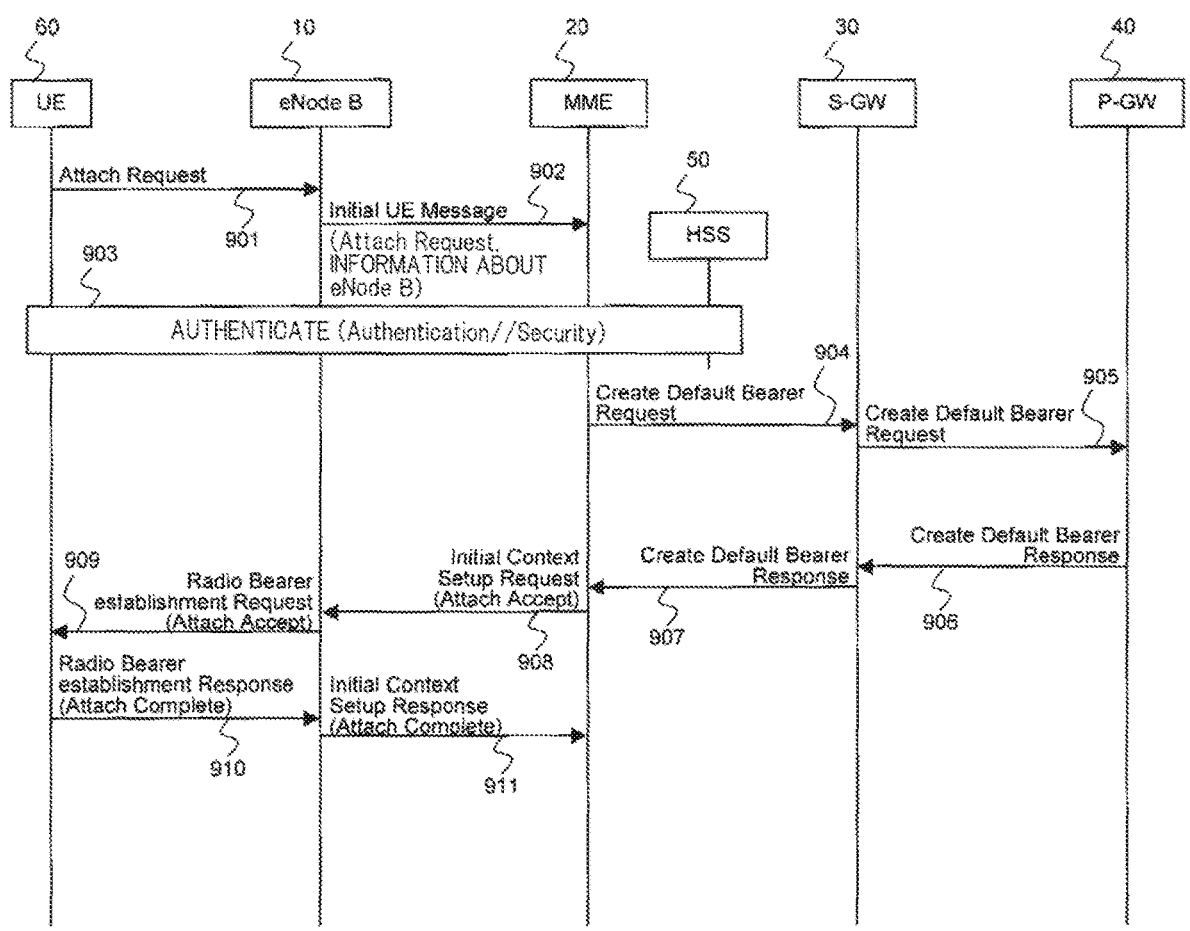
Figure 12:
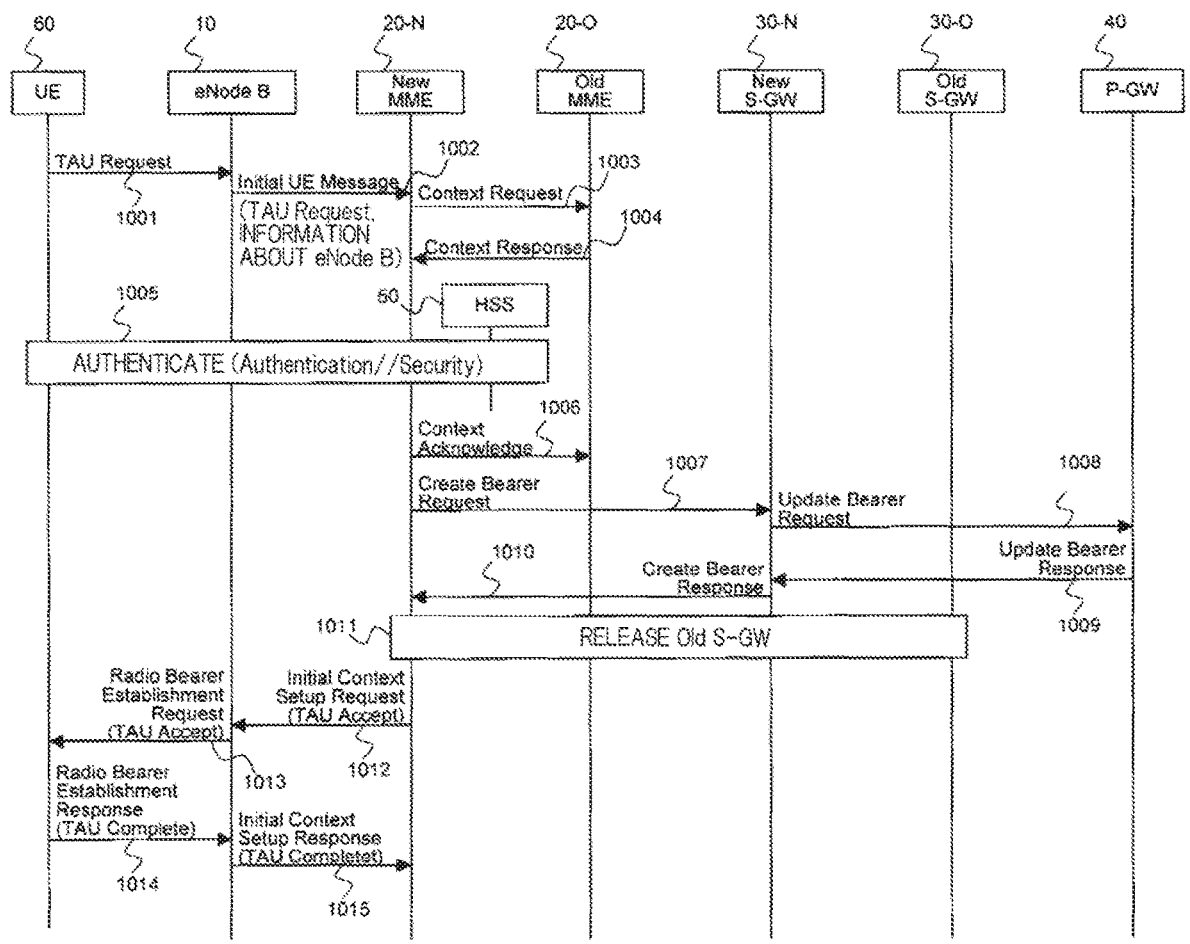

system according to the second exemplary embodiment of the present invention at the time eNode B is added;

FIG. 7 is a diagram showing an example of a map representing the layout of cells;

FIG. 8 is a sequence diagram illustrating an operation of the wireless communication system according to the second exemplary embodiment of the present invention at the time a range covered by the cell of eNode B is changed;

FIG. 9 is a flowchart of an operation sequence of MME when it assigns TAs according to the second exemplary embodiment of the present invention;

FIG. 10 is a flowchart of a processing sequence for calculating a TA range in steps 706, 712 shown in FIG. 9;

FIG. 11 is a sequence diagram illustrating an operation of a wireless communication system according to a third exemplary embodiment of the present invention at the time the UE is attached; and FIG. 12 is a sequence diagram illustrating an operation of a wireless communication system according to a fourth exemplary embodiment of the present invention at the time the LIE registers its location.

BEST MODE FOR CARRYING OUT THE INVENTION

The best mode for carrying out the present invention will be described below with reference to the drawings.

Figure 1:
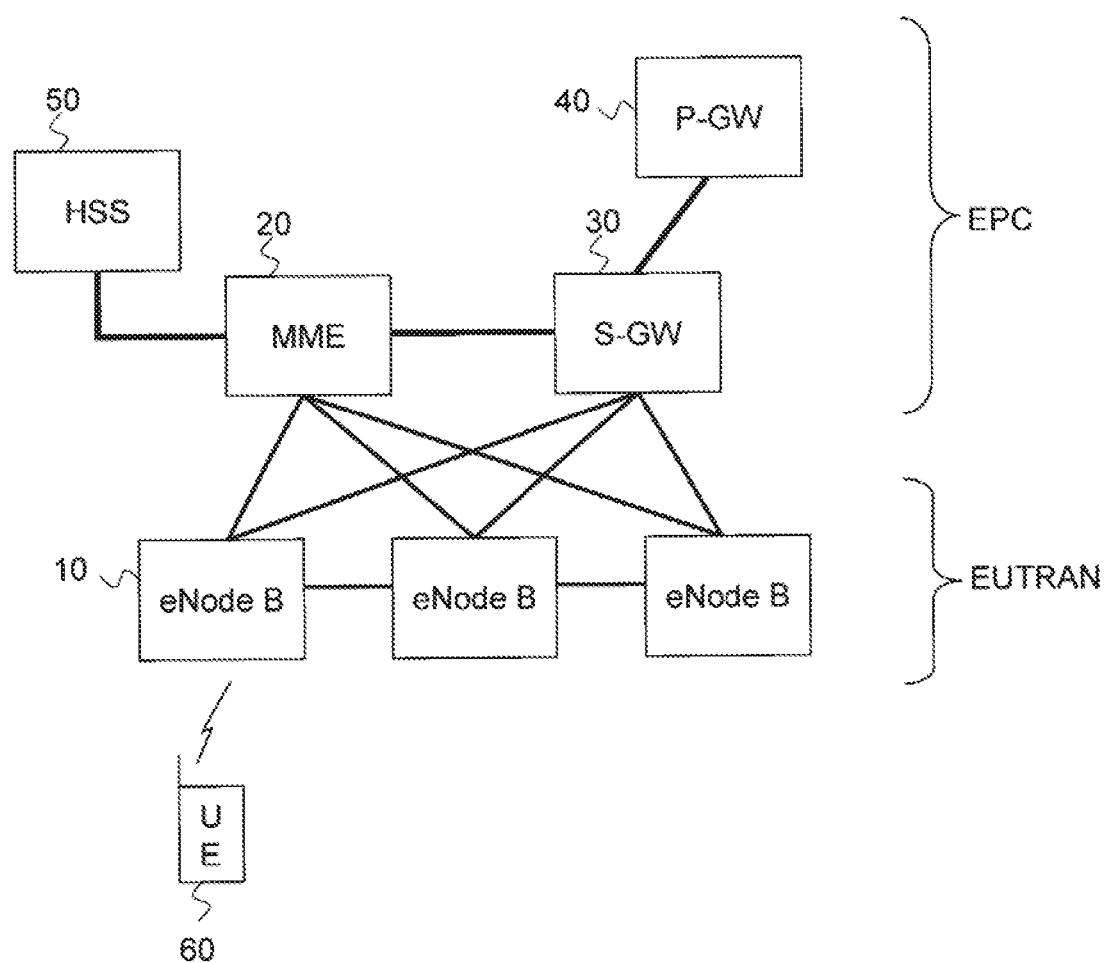
FIG. 1 is a diagram showing the overall configuration of a wireless communication system.

In all exemplary embodiments to be described below, the overall configuration of a wireless communication system is identical to the overall configuration of the wireless communication system shown in FIG. 1.

First Exemplary Embodiment

Figure 3:
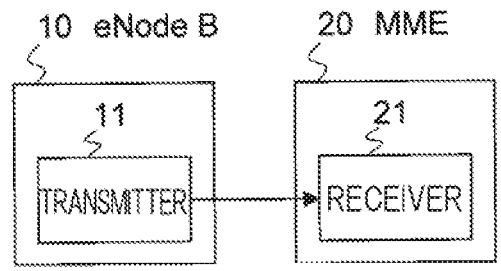
FIG. 3 is a block diagram showing the configuration of a wireless communication system according to a first exemplary embodiment of the present invention.

As shown in FIG. 3, eNode B 10 according to the present exemplary embodiment includes transmitter 11 for transmitting location information of the cell of eNode B 10 and information about the size thereof to MME 20.

MME 20 according to the present exemplary embodiment includes receiver 21 for receiving the location information of the cell of eNode B 10 and the information about the size thereof from eNode B 10.

Operation of the present exemplary embodiment will be described below with reference to FIG. 4.

Figure 4:
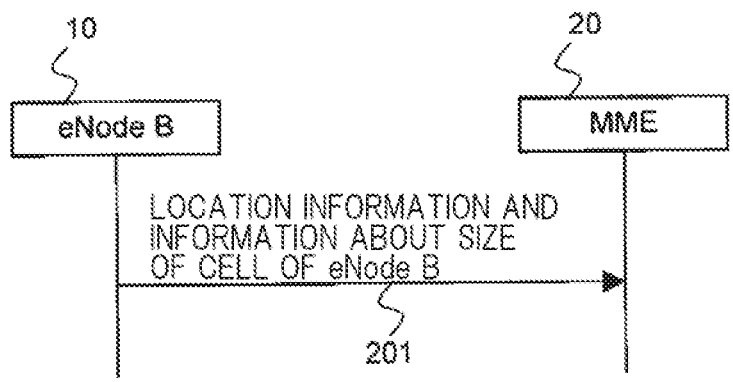
FIG. 4 is a sequence diagram illustrating an operation of the wireless communication system according to the first exemplary embodiment of the present invention.

As shown in FIG. 4, in step 201, transmitter 11 of eNode B 10 sends the location information of the cell of eNode B 10 and the information about the size thereof to MME 20. The information sent to MME 20 is received by receiver 21 of MME 20.

Since MME 20 can recognize the layout of cells by receiving the location information of the cell of eNode B 10 and the information about the size thereof, the OPEX required by manual operation of the operator for assigning TAs can be reduced, and it is possible to assign an optimum number of TAs to UE 60.

Second Exemplary Embodiment

Figure 5:
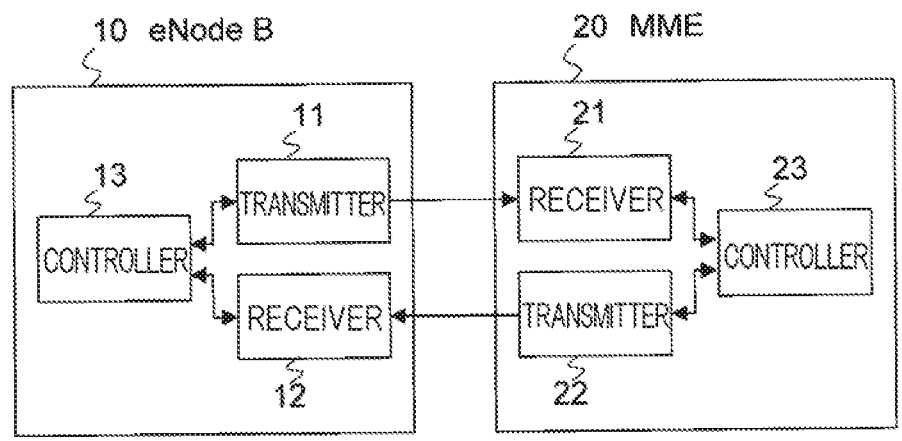
FIG. 5 is a block diagram showing the configuration of a wireless communication system according to a second exemplary embodiment of the present invention.

As shown in FIG. 5, eNode B 10 according to the present exemplary embodiment is different from eNode B10 according to the first exemplary embodiment shown in FIG. 3 in that receiver 12 and controller 13 are added thereto.

Controller 13 includes information about eNode B 10, described below, in a, message.

(1) Location information of the cell of eNode B 10:

For example, the location information of the cell is the information of latitude and longitude of the location of the cell of eNode B 10 (e.g., the central location of the cell or the central location of eNode B 10), which is acquired by a location information measuring device on eNode B 10 using a GPS (Global Positioning System) or the like. The location information of the cell may be information required to calculate the location, which is acquired by eNode B 10 using the GPS or the like.

(2) Information about the size of the cell of eNode B 10:

For example, the size of the cell may represent the diameter or radius of the cell (e.g., 500 m, 1 km, or 2 km). Alternatively, the size of the cell may represent a type indicative of the size of the cell (e.g., Macro, Micro, Pico, or Femto).

(3) TA to which the cell of eNode B 10 belongs:

(4) The eNode B 10 number or the cell number of eNode B 10:

The information (2) through (4) is preset in eNode B 10.

The transmitter 11 sends a message including information (1) through (4) with respect to eNode B 10 to MME 20.

Receiver 12 receives a message including the information of TAs assigned to UE 60 which has registered its location in its own eNode B 10, from MME 20.

Messages are also se and received from UE 60 by transmitter 11, receiver 12, and controller 13.

MME 20 according to the present exemplary embodiment is different from MME 20 according to the first exemplary embodiment shown in FIG. 3 in that transmitter 22 and controller 23 are added thereto.

Receiver 21 receives the message including the information (1) through (4) with respect to eNode B 10 from eNode B 10.

Controller 23 creates a map representative of the layout of cells based on the information (1) through (4) with respect to eNode B 10.

Controller 23 dynamically assigns an optimum number of TAs to UE 60 which has registered its location in eNode B 10, based on the moving speed and moving direction of UE 60 and the map, and includes the information of the assigned TAs in a message.

Transmitter 22 sends the message including the information of the TAs assigned to LIE 60 which has registered its location in eNode B 10, to eNode B 10.

Messages are also sent to and received from S-GW 30 by transmitter 22, receiver 21, and controller 23.

Operation of the present exemplary embodiment will be described below.

In order for the wireless communication system to provide communication services stably and optimally, it adds, removes, and redeploys eNode B 10 depending on the traffic volume in a certain region and the place such as between buildings where a wireless signal from existing eNode B 10 does not reach.

[When eNode B 10 is Added]

Operation at the time eNode B 1.0 is added will be described with reference to FIG. 6.

Figure 2:
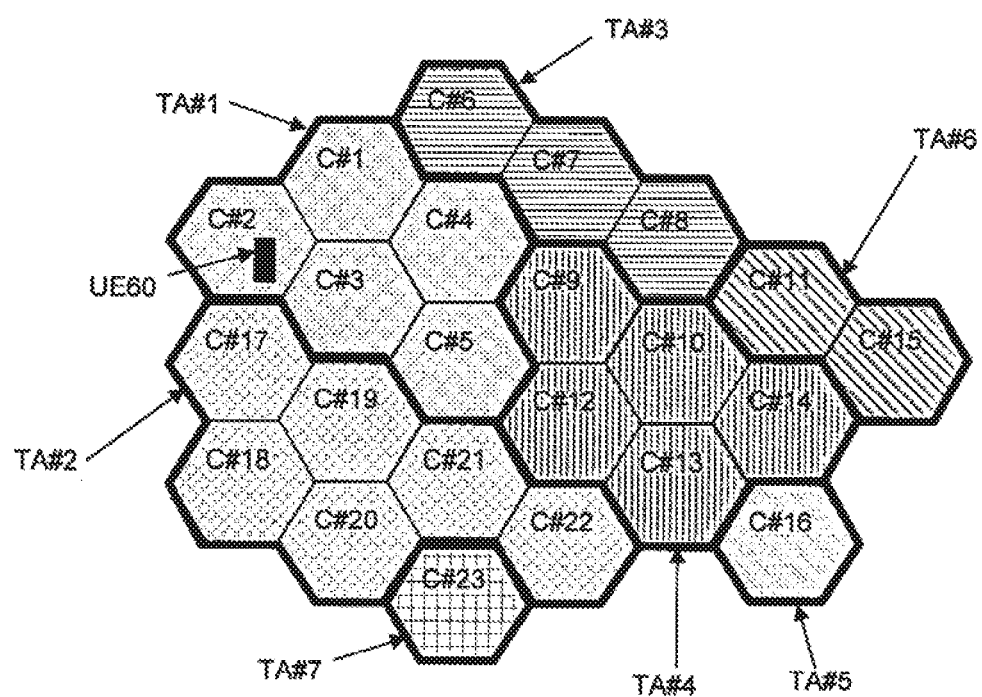
FIG. 2 is a diagram showing another example of a map representing the layout of cells.

It is assumed that, as shown in FIG. 7, C #30 belonging to TA #1 is newly added to the cell layout shown in FIG. 2.

Figure 6:
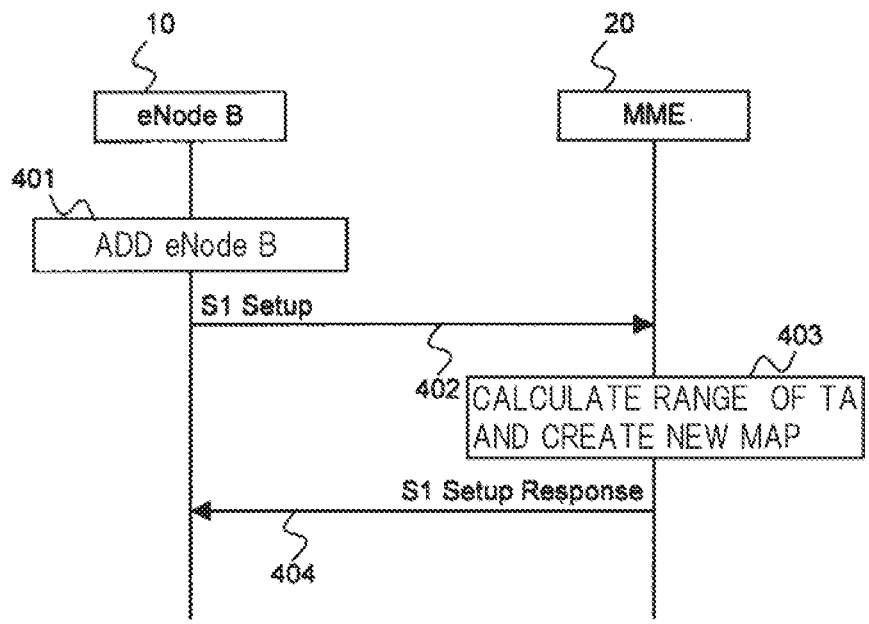
FIG. 6 is a sequence diagram illustrating an operation of the wireless communication.

As shown in FIG. 6, eNode B 10 of C #30 added to TA #1 is newly added in step 401.

In step 402, transmitter 11 of added eNode B 10 sends a setup message (S1 setup message) including the information (1) through (4) with respect to eNode B 10 to MME 20.

Then, in step 403, controller 23 of MME 20 calculates the range of TA #3 based on the location information of C #1 through C #5, C #30 belonging to TA #1, creates a new map as shown in FIG. 7, and stores the new map in a memory (not shown in any of the figures).

Thereafter, in step 404, transmitter 22 of MME 20 sends a response message to the setup message (S1 Setup Response message) to eNode B 10.

[When eNode B 10 is Removed]

When eNode B 10 is removed, the cell of removed eNode B 10 is deleted. Therefore, MME 20 cannot receive a notice from removed eNode B 10. However, when eNode B 10 is removed, the connection link between removed eNode B 10 and MME 20 is cut off.

Controller 23 of MME 20 judges eNode B 10 whose connection link to its own MME 20 has been cut off as being removed, deletes the cell of removed eNode B 10 from the map, creates a new map, and stores the new map in the memory (not shown in any of the figures).

[When the Range Covered by the Cell of eNode B 10 is Changed]

Operation at the time the range covered by the cell of eNode B 10 is changed will be described below with reference to FIG. 8.

As shown in FIG. 8, in step 601, the range covered by the cell of eNode B 10 is changed because of a redeployment or configurational change (replacement of the antenna, a change in the antenna direction, etc.) of eNode B 10.

In step 602, transmitter 11 of eNode B 10 with the cell-covered range being changed sends a reconfiguration message (S1 Reconfiguration message) including information (1) through (4) with respect to eNode B 10 to MME 20.

Then, in step 603, controller 23 of MME 20 calculates the range of the TA, to which the cell with the range covered thereby being changed belongs, creates a new map, and stores the new map in the memory (not shown in any of the figures).

Thereafter, in step 604, transmitter 22 of MME 20 sends a response message (S1 Reconfiguration Response message) to the reconfiguration to eNode B 10.

[When the Location of UE 60 is Registered]

When the location of UE 60 is registered (TA Update), controller 23 of MME 20 assigns an optimum number of TAs to UE 60 based on the moving speed Sue and moving direction Dir of UE 60.

(A) Calculation of the Moving Speed Sue of UE 60:

For example, the moving speed Sue of UE 60 can be calculated from a change in the number of TAs assigned when the location of UE 60 is registered within a certain period. Specifically, if the number of TAs has increased, then the moving speed of UE 60 is judged as high. Conversely, if the number of TAs has decreased, then the moving speed of UE 60 is judged as low. Information of the moving speed of UE 60 may acquired by other methods. For example, MME 20 can receive the information of the moving speed which is recognized by UE 60 from UE 60 via eNode B 10.

(B) Calculation of the Moving Direction Dir of UE 60:

For example, the moving direction Dir of UE 60 can be calculated from the track of registered locations of UE 60 within a certain period. Information of the moving direction Dir of UE 60 may acquired by other methods. For example, MME 20 can receive the information of the moving direction which is recognized by UE 60 from UE 60 via eNode B 10.

(C) Assignment of TAs to UE 60:

When TAs are assigned to UE 60, they are assigned such that it takes UE 60 six minutes or more, for example, to travel through all the assigned TAs. The time that UE 60 takes to travel through all the assigned TAs is not limited to six minutes, but may be determined appropriately depending on the design of the system.

Specific Example 1

It is assumed that, as shown in FIG. 7, UE 60 registers its location in eNode B 10 of C #2 belonging to TA #1, the cells belonging to TA #1 and TA #4 have a diameter of 2 km. UE 60 has a moving speed Sue of 80 km/h, and UE 60 has a moving direction Dir from TA #1 to TA #4.

If two TA #1 and TA #4 are assigned to UE 60, then the distance over which UE 60 travels through TA #1 and TA #4 is 10 km across five cells (C #2, C #3, C #5, C #12, C #13) (=2 km*5). Therefore, the time which UE 60 takes to travel through TA #1 and TA #4 is 7.5 minutes (≈10 km/80 km/h). Since it takes UE 60 six minutes or more to travel through TA #1 and TA #4, two TA #1 and TA #4 are assigned to UE 60.

Specific Example 2

It is assumed that, as shown in FIG. 7, UE 60 registers its location in eNode B 10 of C #2 belonging to TA #1, the cells belonging to TA #1 and TA #4 have a diameter of 1.5 km, 60 has a moving speed Sue of 80 km/h, and UE 60 has a moving direction Dir from TA #1 to TA #4.

If two TA #1 and TA #4 are assigned to UE 60, then the distance over which UE 60 travels through TA #1 and TA #4 is 7.5 km across five cells (C #2, C #3, C #5, C #12, C #13) 1.5 km*5). Therefore, the time which UE 60 takes to travel through TA #1 and TA #4 is 5.6 minutes (≈7.5 km/80 km/h). It does not take UE 60 six minutes or more to travel through TA #1 and TA #4.

If three TA #1, TA #4, and TA #5 are assigned to UE 60 and the distance and the time are recalculated, then the time which UE 60 takes to travel through TA #1, TA #4, and TA #5 is 6.8 minutes (≈9.0 km/80 km/h). Since it takes UE 60 six minutes or more to travel through TA #1, TA #4, and TA #5, three TA #1, TA #4, and TA #5 are assigned to UE 60.

Specific Example 3

It is assumed that UE 60 registers its location in eNode B 10 of C #2 belonging to TA #1, as is the case with the above examples, but UE 60 has a moving speed Sue of 0 km/h.

It may be considered that UE 60 is in a company or the like and mostly does not move in daytime. Therefore, only one TA #1, to which C #2 of eNode B 10, in which UE 60 has registered its location belongs, is assigned to UE 60. As only one TA is assigned to UE 60 that mostly does not move in daytime, the paging traffic for paging UE 60, when an incoming call is received, covers only TA #1, the paging traffic is reduced and no burden is imposed on the wireless communication system.

The above process of assigning TAs to UE 60 is described below.

As shown in FIG. 9, when UE 60 registers its location in eNode B 10, controller 23 of MIME 20 calculates a moving speed Sue of UE 60 in step 701. If the moving speed Sue is 0 in step 702, then controller 23 assigns one TA, to which the cell of eNode B 10, in which UE 60 has registered its location, belongs to UE 60 in step 703.

If the moving speed Sue is not 0 in step 702, then controller 23 calculates a moving direction Dir of UE 60 in step 704, and then calculates a range of present TA (TA to which the cell of eNode B 10, in which UE 60 has registered its location, belongs) in step 705.

In the above exemplary embodiment, the range of TA is calculated if the moving speed Sue is not 0. However, the range of TA may be calculated if the moving speed Sue is equal to or higher than a predetermined speed, not 0.

The range of TA is calculated as shown in FIG. 10.

As shown in FIG. 10, the controller 23 sets, as x, the number of cells, of the cells belonging to TA, that are arrayed along the moving direction Dir of UE 60 in step 801.

Then, controller 23 sets, as n, a next cell number (a first cell number when control comes from step 801) in step 802, and then sets, as Dn, the diameter of cell n set in step 802 in step 803. At this time, the diameter of the cell received as the information in above (2) from eNode B 10 is used as the diameter of cell n. If the information in above (2) received from eNode B 10 represents the radius or type of the cell, then the diameter of the cell is determined based on the received information.

Then, controller 23 sets the sum of present TAd (0) when control comes from step 801) and Dn set in step 803 as TAd representative of the range covered by TA, in step 804.

Then, controller 23 sets, as new x, the difference produced by subtracting 1 from the present x in step 805. If x is 0 in step 806, then controller 23 stores TAd set in step 804 in the memory (not shown in any of the figures) in step 807.

If x is not 0 in step 806, then control goes back to step 802, and the same processing is repeated until x becomes 0.

Therefore, the range TAd covered by TA is expressed by the equation 1 below where n represents the cell number.

$$TAd = \sum_{1}^{n} Dn \qquad \text{Equation [1]}$$

Referring back to FIG. 9, controller 23 sets, as TAd, the present range of TA calculated in step 705, and also sets, as TAdm, an initial value 0 in step 706. Controller 23 then sets the sum of TAd and TAdm set in step 706 as new TAd in step 707.

Then, in step 708, controller 23 determines travel time T which UE 60 takes to travel through TA by dividing TAd newly set in step 707 by moving speed Sue calculated in step 701.

Therefore, travel time T of UE 60 is expressed by equation 2 below where in represents the TA number.

$$T = \left[\sum_{1}^{m} TAd(m)\right] \div Sue \qquad \text{Equation [2]}$$

Then, if travel time T calculated in step 708 exceeds a predetermined time of X minutes (a time required for UE 60 to travel through all the assigned TAs) in step 709, then controller 23 assigns the present TAs to UE 60 in step 710.

If travel time T calculated in step 708 is equal to or shorter than the X minutes in step 709, then controller 23 sets, as new TAdm, TAd(m+1) representing a range covered by next TA along the moving direction of UE 60 in step 711. Then, in step 712, controller 23 calculates TAdm newly set in step 711. Control then goes back to step 707, and the same processing is repeated until travel time T exceeds the X minutes.

In the present exemplary embodiment described above, the moving speed Sue and the moving direction Dir are used as the information with respect to the movement of UE 60. However, either the moving speed Sue or the moving direction Dir may be used in the present invention. For example, if only the moving speed Sue is used, then TAs that are present around the location of UE 60 may be assigned. If only the moving direction Dir is used, then a given number TAs along that direction may be assigned.

According to the present exemplary embodiment, as described above, when eNode B 10 is added or when the range that is covered by the cell is changed, eNode B 10 sends a message including the location information of the cell of its own and the information about the size thereof to MME 20.

Therefore, MME 20 can recognize the layout of cells based on the location information of the cell of eNode B 10 and the information about the size thereof, and hence can dynamically assign an optimum number of TAs to UE 60, as is the case with the first exemplary embodiment.

Furthermore, MME 20 is also capable of assigning an optimum number of TAs, which make the number of location registrations of UE 60 and the number of paging events balanced, to UE 60 in view of the moving speed Sue and the moving direction Dir of UE 60.

When eNode B 10 is removed, MME 20 can judge that eNode 10 is removed based on the cut-off of the connection link to eNode B 10.

According to the present exemplary embodiment, since eNode B 10 sends the above information to MME 20, the manual operation of the operator for assigning TAs can be reduced and hence the OPEX can be reduced.

According to the present exemplary embodiment, when UE 60 registers its location, since MME assigns TAs to the based on the information about the layout of eNodes B 10 and the information about the movement of the UE, optimum TAs can dynamically be assigned to the UE depending on the movement of the UE. The movement of the UE may be represented by the moving speed and the moving direction, for example.

Third Exemplary Embodiment eNode B 10 according to the present exemplary embodiment is identical in configuration to, but is different in operation from, eNode B 10 according to the second exemplary embodiment shown in FIG. 5.

According to the first exemplary embodiment, eNode B 10 sends information (1) through (4) with respect to eNode B 10 to MME 20 when eNode B 10 itself is added. According to the present exemplary embodiment, eNode B 10 sends the information when UE 60 attaches itself. Attaching of UE 60 means first access from UE 60 to eNode B 10, e.g., first access after the power supply is turned on. Other details of operation of eNode B 10 are the same as with the second exemplary embodiment.

MME 20 according to the present exemplary embodiment is identical in configuration and operation to MME 20 according to second exemplary embodiment shown in FIG. 5.

Operation of the present exemplary embodiment will be described below with reference to FIG. 11.

As shown in FIG. 11, UE 60 sends a message (Attach Request message) requesting its attachment to eNode B 10 in step 901.

In step 902, transmitter 11 of eNode B 10 as an attachment destination sends a message (Initial UE Message) for starting an attach procedure, including information (1) through (4) with respect to eNode B 10 and information of the Attach Request message, to MME 20.

Then, if an authentication device (not shown in any of the figures) of MME 20 successfully authenticates UE 60 using user information stored in HSS 50 in step 903, then transmitter 22 of MME 20 sends a message (Create Default Bearer Request message) requesting the creation of a bearer to S-GW 30 in step 904.

In step 905, S-GW 30 sends the message (Create Default Bearer Request message) requesting the creation of a bearer to P-GW 40. In steps 906, 907, P-GW 40 sends a response message (Create Default Bearer Response message) to the message requesting the creation of a bearer via S-GW 30 to MME 20.

At this time, controller 23 of MME 20 performs a process of calculating a range of TAs, to which the cell of eNode B 10 as the attachment destination belongs, creating a new map, and storing the new map in the memory, and also a process of assigning TAs to UE 60 which has attached itself.

Then, in step 908, transmitter 22 of MME 20 sends a message (Initial. Context Setup Request message) including the information of TAs assigned to UE 60 and a message (Attach Accept message) accepting the attachment, to eNode B 10. In step 909, transmitter 11 of eNode B 10 sends a message (Radio Bearer Establishment Request message) including the information of TAs assigned to UE 60 and the message (Attach Accept message) accepting the attachment, to UE 60.

Thereafter, in step 910, UE 60 sends a message (Radio Bearer Establishment Response message) including a response message (Attach Complete message) to the message accepting the attachment, to eNode B 10. Then, in step 911, transmitter 11 of eNode B 10 sends a message (Initial Context Setup Response message) including the response message (Attach Complete message) to the message accepting the attachment, to MME 20.

According to the present exemplary embodiment, as described above, when UE 60 attaches itself, eNode B 10 sends information (1) through (4) with respect to eNode B 10 to MME 20. Therefore, the latest information about eNode B 10 can be indicated to MME 20. Other advantages are the same as those of the second exemplary embodiment.

Fourth Exemplary Embodiment eNode B 10 according to the present exemplary embodiment is identical in configuration to, but is different in operation from, eNode B 10 according to the second exemplary embodiment shown in FIG. 5.

According to the first embodiment, eNode B 10 sends information (1) through (4) with respect to eNode B 10 to MME 20 when eNode B 10 itself is added. According to the present exemplary embodiment, eNode B 10 sends the information when UE 60 registers its location. Other details of the operation of eNode B 10 are the same as with the second exemplary embodiment.

MME 20 according to the present exemplary embodiment is identical in configuration and operation to MME 20 according to second exemplary embodiment shown in FIG. 5.

Operation of the present exemplary embodiment will be described below with reference to FIG. 12.

In FIG. 12, existing MME 20 and S-GW 30 are referred to as Old MME 20-O and Old S-GW 30-O, respectively, MME 20 which eNode B 10 has newly selected based on the information included in a location registration request message (TAU Request message) from UE 60 is referred to as New MME 20-N, and S-GW 30 which New MME 20-N has newly selected based on the information included in the TAU Request message is referred to as New S-GW 30-N.

As shown in FIG. 12, UE 60 sends a TAU Request message for location registration to eNode B 10 in step 1001.

In step 1002, transmitter 11 of eNode B 10 as a location registration destination sends a message (Initial UE Message) for starting a TA Update procedure, including information (1) through (4) with respect to eNode B 10 and information of the TAU Request message, to New MME 20-N.

In step 1003, transmitter 22 of New MME 20-N sends a message (Context Request message) requesting context information of UE 60 to Old MME 20-O. In step 1004, transmitter 22 of Old MME 20-O sends a response message (Context Response message) to the message requesting context information of UE 60 to New MME 20-N.

If the authentication device (not shown in any of the figures) of MME 20 successfully authenticates UE 60 using user information stored in HSS 50 in step 1005, then transmitter 22 of new MME 20-N sends a message indicating that the context of UE 60 is validated for New MME 20-N and invalidated for Old MME 20-O to Old MME 20-O in step 1006, and sends a message (Create Default Bearer Request message) requesting the creation of a bearer to New S-GW 30-N in step 1007.

In step 1008, New S-GW 30-N sends a request message (Update Bearer Request message) for changing a data transfer route from Old S-GW 30-O to New S-GW 30-N to P-GW 40. In step 1009, P-GW 40 sends a message (Update Bearer Response message) in response to the request message for changing the data transfer route to New S-GW 30-N. In step 1010, New S-GW 30-N sends a response message (Create Bearer Response message) to the message for requesting the creation of a bearer to New MME, 20-N. In step 1011, a process of releasing the bearer with respect to Old S-GW 30-O is carried out.

At this time, controller 23 of New MME 20-N performs a process of calculating a range of TAs, to which the cell of eNode B 10 as the location registration destination belongs, creating a new map, a process of storing the new map in the memory, and also a process of assigning TAs to UE 60 which has registered its location.

In step 1012, transmitter 22 of new MME 20-N sends a message (Initial Context Setup Request message) including the information of TAs assigned to UE 60 and a message (TAU Accept message) accepting the location registration, to eNode B 10. In step 1013, transmitter 11 of eNode B 10 sends a message (Radio Bearer Establishment Request message) including the information of TAs assigned to UE 60 and the message accepting the to cation registration, to UE 60.

Thereafter, in step 1014, UE 60 sends a message (Radio Bearer Establishment Response message) including a response message (TAU Complete message) to the message accepting the location registration, to eNode B 10. Then, in step 1015, transmitter 11 of eNode B 10 sends a message (initial Context Setup Response message) including the response message (TAU Complete message) to the message accepting the location registration, to MME 20.

According to the present exemplary embodiment, as described above, when UE 60 registers its location, eNode B 10 sends information (1) through (4) with respect to eNode B 10 to MME 20. Therefore, the latest information about eNode B 10 can be indicated to MME 20. Other advantages are the same as those of the second exemplary embodiment.

The present invention has been described above in reference to the exemplary embodiments. However, the present invention is not limited to the above exemplary embodiments. Rather, various changes that can be understood by those skilled in the art within the scope of the invention may be made to the arrangements and details of the present invention.

For example, in the above exemplary embodiments, the LTE wireless communication system has been illustrated. However, the present invention is not limited to the LTE wireless communication system, but is also applicable to other wireless communication systems having mobility management nodes, a base station, and a wireless communication apparatus.

Furthermore, the above exemplary embodiments explain the wireless communication system wherein the mobility management nodes and the gateway are separate from each other. However, the present invention is also applicable to wireless communication systems wherein the mobility management nodes and the gateway are integral with each other.

What is claimed is:

1. A base station comprising:
   a transmitter configured to send, to a node including mobility management function, a first message, the first message including both first information about a tracking area supported in the base station and second information about a size of a cell of the base station; and a receiver configured to receive a response message of the first message from the node including mobility management function.

2. The base station according to claim 1, wherein the first message is a setup request message.

3. The base station according to claim 1, wherein the response message is a setup response message.

4. The base station according to claim 1,
wherein the second information indicates a type of the cell of the base station.

5. A node including mobility management function comprising:
a receiver configured to receive, from a base station, a first message, the first message including both first information about a tracking area supported in the base station and second information about a size of a cell of the base station; and
a transmitter configured to transmit a response message of the first message to the base station.

6. The node according to claim 5, wherein the first message is a setup request message.

7. The node according to claim 5, wherein the response message is a setup response message.

8. The node according to claim 5,
wherein the second information indicates a type of the cell of the base station.

9. A method by a base station comprising:
sending, to a node including mobility management function, a first message, the first message including both first information about a tracking area supported in the base station and second information about a size of a cell of the base station; and
receiving a response message of the first message from the node including mobility management function.

10. The method according to claim 9, wherein the first message is a setup request message.

11. The method according to claim 9, wherein the response message is a setup response message.

12. The method according to claim 9, wherein the second information indicates a type of the cell of the base station.

13. A method by a node including mobility management function comprising:
receiving, from a base station, a first message, the first message including both first information about a tracking area supported in the base station and second information about a size of a cell of the base station; and
transmitting a response message of the first message to the base station.

14. The method according to claim 13, wherein the first message is a setup request message.

15. The method according to claim 13, wherein the response message is a setup response message.

16. The method according to claim 13, wherein the second information indicates a type of the cell of the base station.

* * * * *

UNITED STATES PATENT AND TRADEMARK OFFICE
CERTIFICATE OF CORRECTION

PATENT NO. : 10,791,473 B2
APPLICATION NO. : 16/653360
DATED : September 29, 2020
INVENTOR(S) : Sadafuku Hayashi It is certified that error appears in the above-identified patent and that said Letters Patent is hereby corrected as shown below:

In the Specification

Column 2, Background Art, Line 30; Delete "C #18." and insert --C#18,-- therefor Column 2, Background Art, Line 30; Delete "C #21." and insert --C#21,-- therefor Column 2, Background Art, Line 47; Delete "TA #," and insert --TA#1,-- therefor Column 2, Background Art, Line 61; Delete "in" and insert --m-- therefor Column 4, Brief Description of the Drawings, Line 36; Delete "communication.¶" and insert --communication-- therefor Column 4, Brief Description of the Drawings, Line 57; Delete "LIE" and insert --UE-- therefor Column 5, Best Mode for Carrying out the Invention, Line 33; Delete "a," and insert --a-- therefor Column 5, Best Mode for Carrying out the Invention, Line 59; Delete "se" and insert --sent to-- therefor Column 6, Best Mode for Carrying out the Invention, Line 10; Delete "LIE" and insert --UE-- therefor Column 6, Best Mode for Carrying out the Invention, Line 24; Delete "eNode B 1.0" and insert --eNode B 10-- therefor Column 7, Best Mode for Carrying out the Invention, Line 45; Delete "2 km." and insert --2 km,-- therefor Column 7, Best Mode for Carrying out the Invention, Line 61; After "1.5 km,", insert --UE--
Column 7, Best Mode for Carrying out the Invention, Line 67; Before "1.5 km*5).", insert --(=--

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,791,473 B2

Column 8, Best Mode for Carrying out the Invention, Line 29; Delete "MIME" and insert --MME-- therefor Column 8, Best Mode for Carrying out the Invention, Line 57; Delete "(0)" and insert --(0-- therefor Column 9, Best Mode for Carrying out the Invention, Line 17; Delete "in" and insert --m-- therefor Column 10, Best Mode for Carrying out the Invention, Line 2; After "to the", insert --UE--

Column 10, Best Mode for Carrying out the Invention, Line 57; Delete "(Initial." and insert --(Initial-- therefor Column 12, Best Mode for Carrying out the Invention, Line 5; Delete "MME," and insert --MME-- therefor Column 12, Best Mode for Carrying out the Invention, Line 22; Delete "to cation" and insert --location-- therefor Column 12, Best Mode for Carrying out the Invention, Line 29; Delete "(initial" and insert --(Initial-- therefor